US005550546A

United States Patent [19]
Noneman et al.

[11] Patent Number: 5,550,546
[45] Date of Patent: Aug. 27, 1996

[54] ADVANCED PARAMETER ENCODER WITH DUAL INTEGRATED PULSE PRESENT DETECTION AND CHANNEL/SECTOR ARBITRATION

[75] Inventors: Mark E. Noneman, Ramona; Donald A. Porter, San Diego, both of Calif.

[73] Assignee: TRW Inc., Redondo Beach, Calif.

[21] Appl. No.: 433,174

[22] Filed: May 3, 1995

Related U.S. Application Data

[63] Continuation of Ser. No. 154,906, Nov. 19, 1993, abandoned.

[51] Int. Cl.⁶ .................................................. G01S 7/292
[52] U.S. Cl. ................................................. 342/13; 342/20
[58] Field of Search .......................................... 342/13, 20

[56] References Cited

U.S. PATENT DOCUMENTS

| | | |
|---|---|---|
| 4,021,653 | 5/1977 | Sharp et al. . |
| 4,837,579 | 6/1989 | Pease et al. . |
| 4,956,644 | 9/1990 | Leahy et al. ............... 342/20 |
| 5,235,339 | 8/1993 | Morrison et al. . |
| 5,349,333 | 9/1994 | Björkman ................... 342/20 |
| 5,361,069 | 11/1994 | Klimek, Jr. et al. ......... 342/20 |
| 5,451,956 | 9/1995 | Lochhead .................... 342/13 |

Primary Examiner—Daniel T. Pihulic

[57] ABSTRACT

In a channelized receiver there is dual pulse present detection in which an RF signal is converted to a digital word and there are dual digital thresholds, each digital threshold having a programmable standard for determining when a pulse is present after said pulse has exceeded the particular threshold value and for determining which pulse will be reported based on which pulse arrived first. The invention also involves arbitration between adjacent channels in a channelized receiver to determine which signals are real and which signals represent spill-over energy from signals in adjacent channels and also including arbitration between spatial sectors to determine which signals are real and which signal represents spill-over energy from adjacent sectors.

15 Claims, 7 Drawing Sheets

INTEGRATION REGISTER DATA TRANSFER

ADVANCED PARAMETER ENCODER WITH DUAL INTEGRATED PULSE PRESENT DETECTION AND CHANNEL/SECTOR ARBITRATION

CROSS-REFERENCE TO RELATED APPLICATION

This is a continuation of U.S. patent application Ser. No. 08/154,906, filed Nov. 19, 1993 and now abandoned.

This application is related to the following four applications:

"Instantaneous Parameter Measuring Receiver" filed on Aug. 20, 1993 by Don Lochhead, with Ser. No. 08/109,804, now U.S. Pat. No. 5,451,956; "Parameter Encoder Architecture" filed on Nov. 19, 1993 by inventor Mark E. Noneman et al., with Ser. No. 08/154,909, now abandoned; "Advanced Parameter Encoder with Pulse-On-Pulse Detection and Pulse Fragment Reconstruction" filed on Nov. 19, 1993 by inventor Mark E. Noneman et al., with Ser. No. 08/154,908, now abandoned; and "Advanced Parameter Encoder With Environmental Filter Capability" filed on Nov. 19, 1993 by inventor Mark E. Noneman, with Ser. No. 08/154,907, now U.S. Pat. No. 5,477,227 all of which are hereby incorporated by this reference.

FIELD OF THE INVENTION

This invention relates to an RF channelized receiver capable of detecting multiple RF pulses of varying amplitude and frequency and determining through arbitration which pulses are real and which pulses represent spill-over energy so that only one pulse descriptor word (PDW) is reported for each signal that is received.

BACKGROUND OF THE INVENTION

Electronic warfare systems are used on modern military aircraft as part of their offensive and defensive capabilities. These electronic warfare systems emit RF (radio frequency) signals that travel through space. Radar systems use RF emissions to locate and track opposing aircraft and some radar systems are incorporated within missiles to assist in the self-guided propulsion of a missile to its target. An electronic warfare search receiver is used defensively to detect those RF emissions. The receiver searches the range of frequencies (the RF spectrum) in which the RF emissions are likely to occur..The receiver then detects and analyzes the nature of the RF signals. By determining the characteristics of the signals received, the defender will know the nature of the threat and, for example, will know if a radar guided missile has "locked on" to the defender's aircraft. These systems are used in friendly as well as unfriendly aircraft. In a tactical or strategic environment, the number of aircraft and the density and diversity of the emissions in the RF spectrum is quite large and is expected to increase. Existing detection and monitoring equipment that use wide band search receivers will find the RF emissions difficult or impossible to successfully monitor in such an environment. For example, some existing wide band receiver designs employ a threshold detector that requires the incoming signal to attain a certain amplitude before it is recognized as a true signal apart from the ordinary RF background noise. These receivers are incapable of differentiating between high amplitude short duration and low amplitude longer duration pulses when they are first detected. With the existing designs, it is entirely possible that a first RF pulse received will effectively prevent detection of a second RF pulse, from another emitter, during the presence of the first pulse. The first emission source may be identified but the second source is, in effect, masked. Also, in a multiple channel receiver or a channelized receiver, quite frequently there is spill-over energy between the channels. Therefore, multiple pulses may be detected when in fact there is only one emission source. Also, in a spatial domain, when using a four quadrant receiver, a signal coming from one direction may be detected in the other three receiver quadrants and reported as additional signals when in fact there is only one signal from one source.

It is unlikely that a single receiver type will be capable of meeting all offensive or defensive threat detection and analysis requirements dictated by the future electronic warfare environment. Instead a set of search and analysis receivers of complimentary capabilities are likely to be required to meet future demands. Trade offs between probability of intercept, bandwidth, simultaneous signal resolution, sensitivity, receiver complexity and power consumption are necessary. Discriminating between high amplitude short duration pulses and lower amplitude longer duration pulses is an important ability for a modern channelized receiver. It is also important to eliminate any signal detections that occur because of spill-over energy either in the spatial domain or the frequency domain which could cause a single signal to be reported more than once. Reporting one signal three or four times causes confusion and does not accurately reflect the true source of the emission. It would be advantageous to have the ability to detect and differentiate between high amplitude short duration pulses and lower amplitude longer duration pulses and at the same time reject signal detections caused by rabbit ears and backlobe emissions that occur respectively in the frequency and spatial domains.

SUMMARY OF THE INVENTION

The invention is a method and apparatus for processing the log video output of a channelized receiver. The overall system is capable of measuring the signal parameters of RF pulses including frequency, time of arrival, pulse width, pulse amplitude and angle of arrival. To assist in identifying these pulse parameters, the present invention employs a dual integrated pulse present detection system so that each channel in a channelized receiver has the capability of detecting and differentiating between high amplitude short duration pulses and lower amplitude longer duration pulses. This aspect of the invention is accomplished by employing dual threshold limits each of which has a programmable pulse detection criteria. For instance, a high threshold could require that 2 out of the last 3 consecutive amplitude samples fall above the high threshold limit. For the lower threshold limit the requirement could be programmed so that 4 out of the last 5 consecutive amplitude samples have risen above the lower threshold limit. Therefore, each channel in a channelized receiver will be able to detect short duration high amplitude pulses as well as longer duration lower amplitude pulses. It is important that the pulse detection criteria for each threshold level is independent of the other and that the pulse detector criteria is programmable. The programmable pulse detection criteria gives each channel of the receiver the flexibility to look for and detect multiple types of pulses.

Another aspect of the invention involves the ability to eliminate false signals in the frequency and spatial domains. In a channelized receiver with band-pass filters occupying adjacent frequency spectrums, it is possible that a single signal will have spill-over energy in adjacent frequency bands causing rabbit ears that may appear and be reported as separate signals. It is important to eliminate these signals. The present invention eliminates these signals by first determining the time of arrival for each pulse and then establishing a time period before and after the time of arrival for each pulse. If there is a coincidence between these time periods in adjacent channels then an arbitration is declared. The pulse detector also integrates a portion of the power received for a certain time period for each pulse. The system then compares the total integrated power stored for each pulse and selects the pulse with the highest integrated power. The other pulses with lower integrated total power are then rejected. If a signal occurs exactly on the border between two channels, then two of the reported signals will have identical times of arrival and identical total integrated power levels. Under these circumstances the system automatically selects one of the identical signals and only reports that signal as a PDW. In the spatial domain a receiver system may have four antennas each covering one quadrant of space. A signal received in one particular quadrant may also be received by the other three antennas covering the other quadrants of space. Again, for each of these signals the time of arrival is determined and then a predetermined time period before and after each time of arrival is set. If there is a time of arrival signal reported within these coincident windows then an arbitration is declared between sectors. Also, a portion of the power of each signal is integrated and becomes a figure for comparison to the other signals that have TOA's within the coincidence windows. Each of the signals in each of the quadrants is compared to the other signals in the other quadrants and the signal with the highest integrated power level is selected. The remaining three signals are rejected and not reported as pulse descriptor words (PDW's). If a signal occurs exactly on the border between two quadrants, then two of the reported signals will have identical times of arrival and identical total integrated power levels. Under these circumstances the system automatically selects one of the identical signals and only reports that signal as a pulse descriptor word.

Therefore, it is an object of the present invention to provide a channelized receiver with a capability of detecting and differentiating between RF pulses that vary in amplitude and pulse width. It is another object of the present invention to be able to eliminate multiple unwanted signal detections that occur as a result of spill-over energy in either the frequency or the spatial domain. The foregoing objects and advantages of the invention together with the structure and characteristics thereof, briefly summarized in the foregoing passages, will become more apparent to those skilled in the art upon reading the detailed description of the preferred embodiment taken together with the following illustrations.

DETAILED DESCRIPTION OF THE PREFERRED EMBODIMENT

The present invention is a portion of a channelized receiver that converts a log video RF signal to digital information that is used to detect received pulses and to discriminate between real and spurious signals occurring in both the frequency and space domain. The novel detection and discrimination apparatus and method will now be described.

Figure 1:
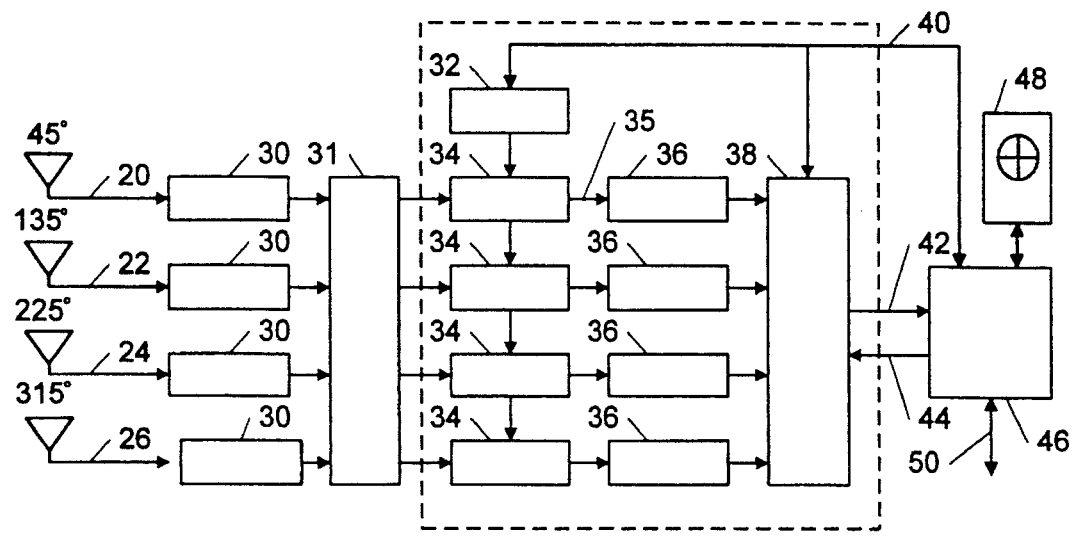
FIG. 1 is a simplified block diagram of an overall channelized receiver system.

FIG. 1 is an overall block diagram of a channelized receiver that would be employed in an aircraft to receive, detect and analyze RF signals from a variety of possible emission sources including enemy aircraft, enemy missiles and fixed radar locations.

Turning now to FIG. 1, FIG. 1 is an overall block diagram of a channelized receiver in which the present invention can be used. This is an illustration of the type of receiver that would suitable for the present invention although the present invention can be used in other types of receivers such as narrow band single channel and interferometer receivers. Antennas 20, 22, 24 and 26 represent the four antennas that would typically be used to cover 360° of spatial domain surrounding an aircraft. Each antenna receives signals from approximately 90° of air space to cover the entire 360° range. The receivers 30 are identical and receive the signals intercepted by antennas 20–26. The receivers 30 are typically wide band, front end low noise amplifiers that are placed close to the antennas to minimize noise interference that could be introduced through long cable connections. Bus 40 is a command and control bus that is used to coordinate and control the overall function of the channelized receiver. Each output of the receivers 30 is connected to an IF switch 31 and tuner 34. Local oscillator 32 is connected to each of the tuners 34 to provide the tuners with the ability to select IF frequency bands and down convert a bandwidth from, for instance, 6 to 7 gigahertz for an individual receiver to 0.5–1.5 gigahertz. The output bandwidth of each tuner 34 is connected to one of the four channelizers 36. The channelizers 36 consist of a number of adjacent band-pass filters that are used to discriminate between signals that may be contained in various frequencies across the spectrum selected by the IF tuner. Each of these band-pass filters can cover a frequency range of from 20 to 100 MHz and typically will have a crossover with its adjacent filter at −1 dB of attenuation. The outputs of the channelizers are connected to the parameter encoder module 38 which is ultimately responsible for producing a pulse descriptor word for each separate signal that has been received across the frequency spectrum covered by antennas 20–26 and receivers 30. The pulse descriptor word which is a long digital word describing the individual characteristics of each received signal is transferred to an emitter identification processor 46 that determines the nature and possible significance of any signal that is received. The emitter identification processor 46 then transfers information concerning the received signal to a cockpit display 48, for instance, or via line 50 to an aircraft controller. FIG. 1 is intended to identify an overall system in which the present invention is useful.

Figure 2:
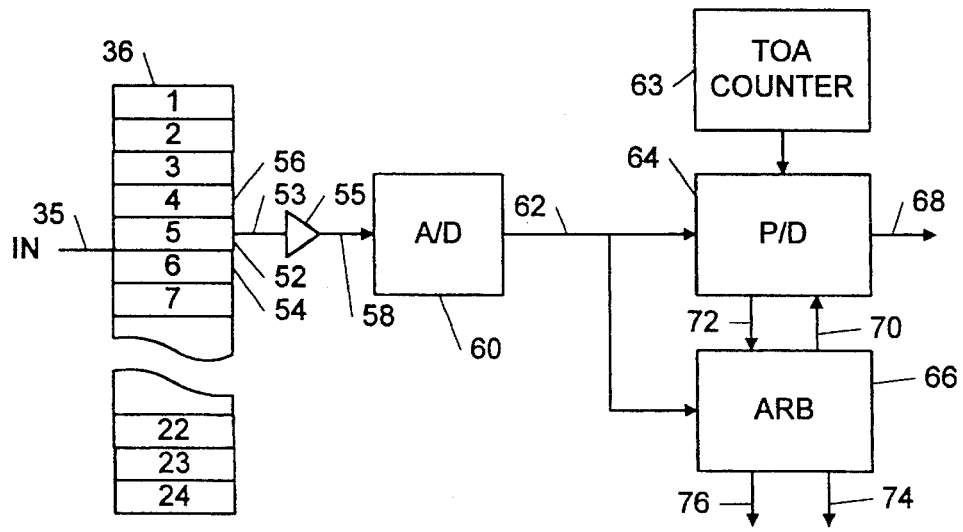
FIG. 2 is a more detailed block diagram showing the pulse detector and arbitration sections.

FIG. 2 is a more detailed block diagram of the portion of the channelized receiver in which the invention is useful. Input 35 to the channelizer 36 is distributed among, for example, 24 separate band-pass filters in channelizer 36. Each band-pass filter is responsible for a specific portion of the frequency spectrum covered by its associated tuner 34. Each of the individual band-pass filters in channelizer 36 has an output which is connected through a logarithmic detector amplifier 55 to an A/D converter 60. To illustrate this, band-pass filter 52 is connected via line 53 to amplifier 55 which is connected via line 58 to A/D converter 60. The output of the logarithmic amplifier detector 55 is a log video output Any RF signal with a frequency covered by band-pass filter 52 will appear on the log video output line 58. The adjacent band-pass filters 54 and 56 cover frequency spectrums that are above, below and adjacent to the frequency spectrum covered by band-pass filter 52. Therefore, each of the 24 band-pass filters will have its associated logarithmic detector amplifier 55 and A/D converter 60 which in turn will have its associated pulse detection and arbitration modules discussed below. The A/D converter 60 continuously samples it log video input on a periodic basis and converts the log video into, for example, an 8-bit digital word that represents the instantaneous amplitude of the input video signal. These digital words are transferred to the pulse detector 64 and to the arbitration module 66. The pulse detector 64 is connected via line 70 and 72 to the arbitration module 66. The arbitration module 66 is in turn connected via lines 74 and 76 to adjacent arbitration modules, the operation of which will be discussed with reference to FIGS. 7–15. The pulse detector module 64 has an associated Time of Arrival (TOA) counter 63 that is used to determine the time of arrival or when a pulse is first detected. The time of arrival corresponds to the leading edge of a received RF signal. The output of the pulse detection module 64 is transferred on line 68 to other pulse measurement and calculation modules that complete the collection of parameters for each detected signal.

Figure 3:
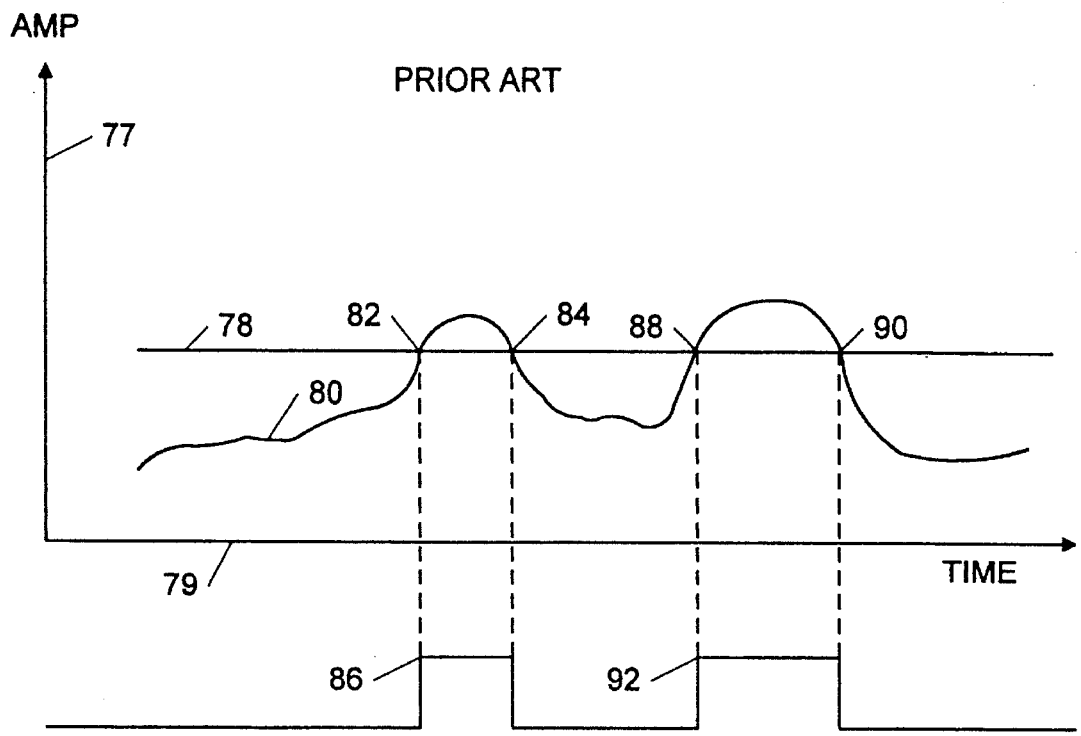
FIG. 3 is a prior art waveform diagram showing previous methods of pulse present detection.

Turning now to FIG. 3, FIG. 3 is a diagram of a waveform and the way in which pulses were recognized in the prior art. Vertical axis 77 represents amplitude and horizontal axis 79 represents time. Line 78 represents an amplitude threshold level above which a pulse is recognized. Waveform 80 is below the threshold level 78 until it reaches point 82 at which time it crosses threshold 78. At the point where the waveform crosses threshold 78, a pulse present signal 86 appears. As waveform 80 crosses back through the threshold 78 at point 84 the pulse present signal 86 terminates. When the waveform 80 again crosses the threshold 78 at point 88 another pulse present signal 92 appears. When the waveform 80 falls below the threshold 78 at point 90 the pulse present waveform 92 again terminates. The actual comparison of the log video signal to the threshold level 78 was accomplished using an analog comparator as opposed to comparing digital samples of analog information. The prior art system is unable to detect and differentiate between high amplitude narrow pulses and lower amplitude but longer duration pulses.

Figure 4:
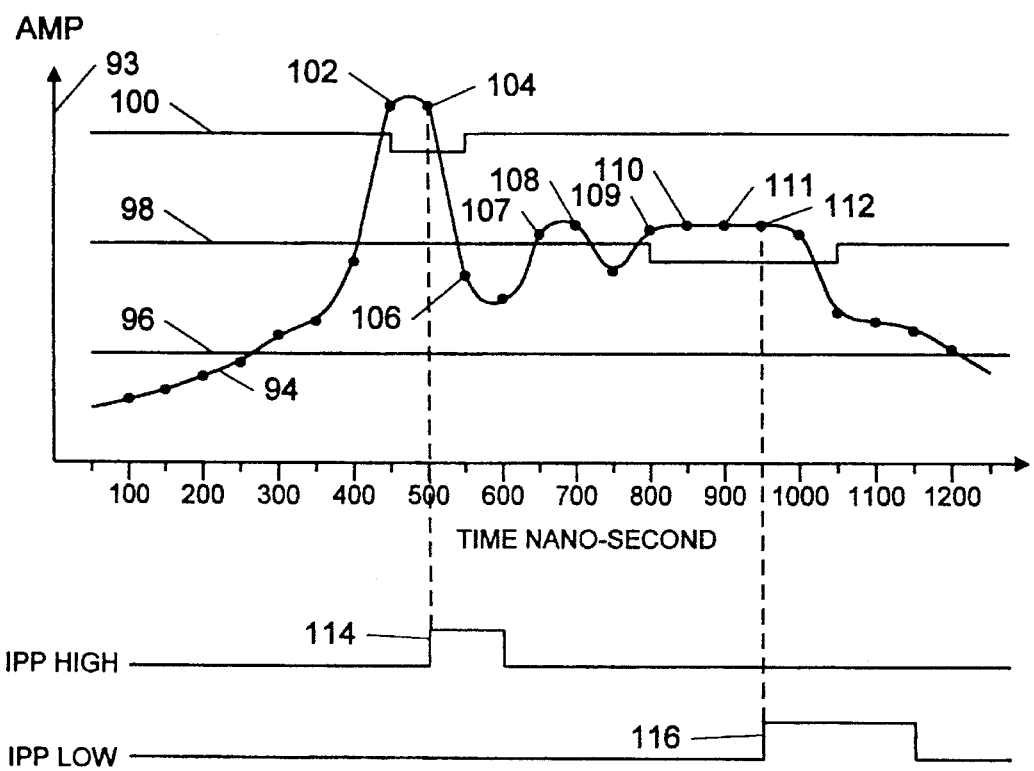
FIG. 4 is a detailed waveform diagram showing the dual integrated pulse present detection system of the present invention.

The operation of the present invention is shown in FIG. 4. The dual integrated pulse present detector of the present invention uses the digital amplitude samples such as samples 102 and 104 to determine when pulses are present. The diagram shown in FIG. 4 has amplitude shown along the vertical axis 93 and time in nanoseconds shown along the horizontal axis. For the purpose of this figure, the A/D converter 60 in FIG. 2 samples the input log video every 50 nanoseconds. However, the log video can be sampled by the A/D converter 60 as frequently as every 20 nanoseconds. The clock rate for the system is normally fixed at a rate which is approximately twice the band width of the signals that are looked for by the receiver. The algorithms used to sample the incoming log video are independent of the clock rate so that each system may be designed to optimally detect the narrowest pulsed signal required of the receiver. Line 96 represents an adaptive noise floor that can be either fixed or movable in which amplitude measurements that are taken when pulses are not present are used to control the level of the adaptive noise floor 96. Threshold 98 represents an IPP low threshold and threshold 100 represents the IPP high threshold. The amplitude of waveform 94 is continuously sampled every 50 nanoseconds to determine when a pulse is present. When pulse samples 102 and 104 occur above the high threshold 100, the pulse detector 64 can use this digital information to determine that a pulse is present. Associated with each threshold 98 and 100 is a separate algorithm that is used to determine whether or not a pulse is present. This pulse detection algorithm is programmably selectable for individual applications.

The pulse present integration logic provides two detection algorithms for integrating the pulse present signal: a sliding window integration approach and a consecutive count threshold approach.

The first approach shall be a programmable M out of N integration of the pulse present signal. The integrated pulse present signal shall use a window of N samples during which it shall compare the number of samples above the pulse present threshold to two programmable integration thresholds. When the number of pulse present signals in N consecutive samples is greater than or equal to M then the IPP signal shall transition from false to true. When the number of pulse present signals in N censecutive samples is less than J then the IPP signal shall transition from true to false. M and J may assume values ranging from, for example, 1 to 32 and N may be from 1 to 32 as long as J is less than or equal to M which is less than or equal to N.

The second approach shall require M consecutive samples above the pulse present threshold for gain of IPP and J consecutive sample below the pulse present threshold to lose IPP. Again, M and J may be any value between, for example, 1 and 32. Thus, for the IPP high or low signal to terminate, J consecutive pulse samples must be below the particular IPP threshold that was activated.

In the present example, the method of determining that a high amplitude narrow pulse is present is that M out of the last N amplitude samples occur above the upper threshold 100. In this case, when 2 out of the last 3 amplitude samples occur above threshold 100, a pulse present is declared and an integrated pulse presence high signal 114 is activated. This occurs when sample 104 is taken because this sample meets the requirement that 2 out of the last 3 samples have occurred above the amplitude threshold 100. To determine the TOA, the system looks for the last time that the threshold was crossed before M out of N pulses were received. The last time the threshold was crossed is the time of arrival or TOA. If a sample rate of 20 nanoseconds was used then a much shorter pulse could be detected using the formula 2 out of the last 3 pulses must be above the amplitude threshold 100 to detect a pulse. The IPP high signal is independent of anything that transpires with respect to the lower amplitude threshold 98. Amplitude sample 106 occurs below both amplitude thresholds and the signal continues below both amplitude thresholds until sample 107 occurs. Samples 107–108 occur above the lower amplitude threshold 98 but do not meet the integrated pulse present criteria for lower amplitude signals. Samples 109–112 occur above the lower amplitude threshold 98 and can be used to determine that a lower amplitude, longer duration pulse is present. For instance, the algorithm associated with lower amplitude threshold 98 could require that 4 out of the last 5 amplitude samples be above the low amplitude threshold 98. When amplitude sample 112 is taken, the criteria for declaring a pulse present has been met because 4 out of the last 5 amplitude samples have occurred above the lower threshold 98. Thus, integrated pulse presence (IPP) low signal 116 is activated at the occurrence of amplitude sample 112. At this point, it should be noted that the TOA counter 63 is sampled upon the occurrence of amplitude samples 102 and 109 respectively. In this manner, the proper TOA of the pulse is recorded even though the pulse presence signal is not declared until a programmable number of amplitude samples later. Each amplitude threshold 98 and 100 has its own independently programmable pulse present criteria each of which produces a separate pulse presence signal. In this manner, each channel of a channelized receiver has the capability of detecting both high amplitude short duration pulses as well as lower amplitude longer duration pulses.

Both of the thresholds 98 and 100 can provide hysteresis such that once an amplitude sample passes above either of the thresholds that threshold will drop a preprogrammed amount. Once the amplitude sample passes below this dropped threshold value the threshold is returned to its former value to await a new threshold crossing. Hysteresis acts independently for both high threshold 100 and low threshold 98.

Figure 5:
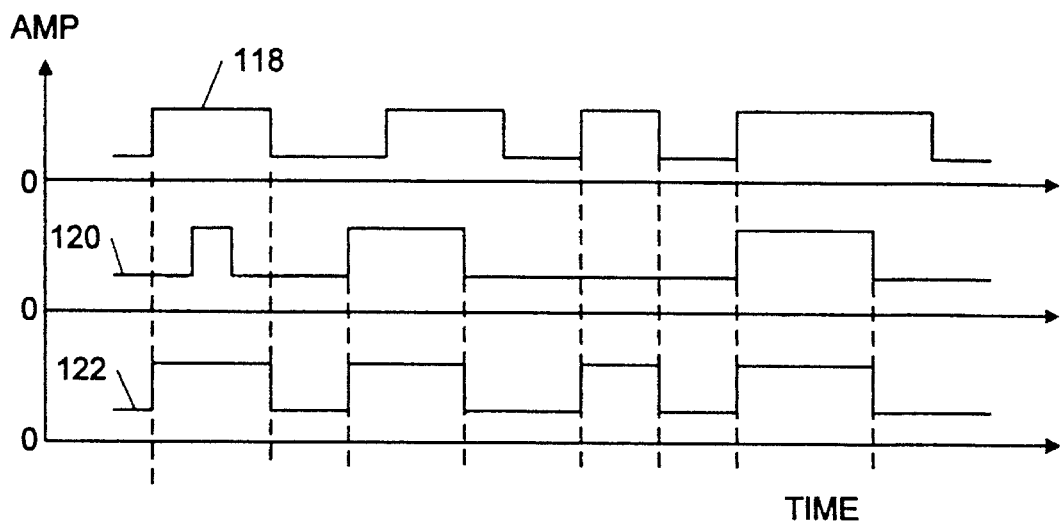
FIG. 5 is an output waveform diagram showing the resolved output waveform of the pulse detector.
Figure 6:
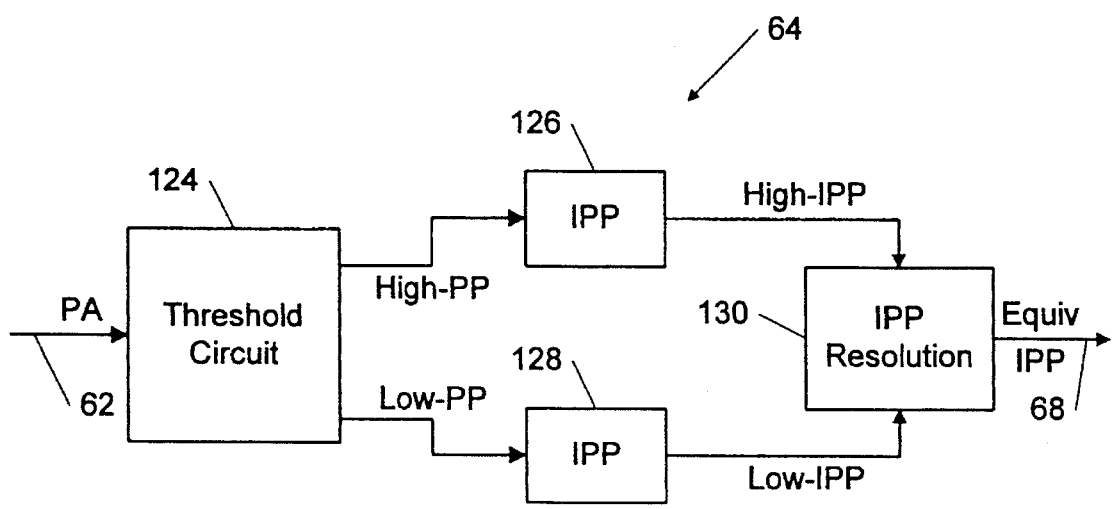
FIG. 6 is a block diagram of the dual integrated pulse present detection system.

Another aspect of the invention is the manner in which either a high amplitude or lower amplitude pulse will be selected for reporting. FIG. 5 represents a logic chart for determining whether the IPP high signal or the IPP low signal will be reported in the PDW. In FIG. 5, waveform 118 represents the output of the IPP low line and waveform 120 represents the output of the IPP high line. These waveforms will be discussed in conjunction with FIG. 6 which is a more detailed block diagram of the integrated pulse present detector. When both an IPP high and IPP low signal are reported, the pulse detection module 64 will select the pulse that occurs first in time. This selection process is illustrated in FIG. 5. Waveform 122 represents the output signal on line 68 of the pulse detection module 64. If the IPP low signal 118 occurs first in time then it will be reported on line 68. Similarly, if the IPP high signal 120 occurs first then it will be reported on output 68. If both the IPP high and IPP low signals occur at the same time then the system will default and select the IPP high signal 120 as illustrated in FIG. 5. In FIG. 6, input 62 represents the input from A/D converter 60 shown in FIG. 2. The high pulse present signal is reported to the IPP circuit 126 and the low pulse present signal is reported to the IPP circuit 128. The output of these circuits are connected to IPP resolution module 130 which produces the waveform 122 shown in FIG. 5. When the IPP resolution module 130 selects the pulse that occurred first in time, the other pulse that was not selected will be disregarded and will not be reported as part of a PDW.

The dual integrated pulse detection has been discussed with reference to two threshold levels. However, the concept of the invention is applicable to more than two levels of pulse detections. As more levels of detection are added other limitations come into play such as cost and the amount of hardware necessary to implement the invention as well as the amount of power consumption by the receiver.

The channel/sector arbitration aspect of the present invention will now be discussed with reference to FIGS. 7–15.

Figure 7:
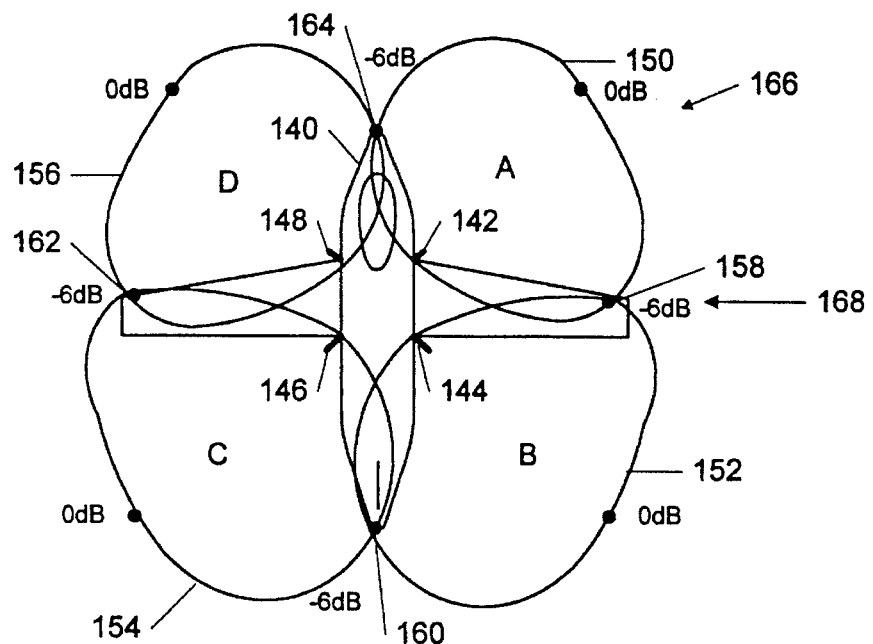
FIG. 7 is a diagram showing four sectors of a channelized receiver as they could be mounted on an airplane.

FIGS. 7–15 relate to another aspect of the present invention in which the system is able to identify and eliminate false RF signals that occur in both the frequency and spatial domains. The elimination of false pulses is accomplished through channel arbitration in the frequency domain and sector arbitration in the spatial domain. FIG. 7 shows airplane 140 having antennas 142, 144, 146 and 148. Antenna 142 has reception zone 150 which corresponds to one quadrant or sector. This sector is referred to as Sector A. Similarly, antennas 144, 146 and 148 have reception zones 152, 154 and 156 respectively. These reception zones are respectively referred to Sectors B, C and D. Sector A has a –6 dB crossover point with its neighboring sectors D and B identified as –6 dB crossover points 164 and 158. In a similar manner, Sector B has 6 dB crossover points with its neighboring Sectors A and C. These are crossover points 158 and 160. Sector C has –6 dB crossover points 160 and 162 with its respective neighboring Sectors B and D and Sector D has –6 dB crossover points 162 and 164 with its neighboring Sectors C and A. With the antennas arranged in this manner, the airplane can detect incoming RF signals in a 360° range. The antennas 142, 144, 146 and 148 correspond to the antennas 20, 22, 24 and 26 respectively shown in FIG. 1. Arrow 166 represents an incoming RF signal that will impact Sector A at the zero dB point or at the bore sight. Arrow 168 also represents an incoming RF signal that will impact Sectors A and B at the –6 dB crossover point 158 resulting in identical signals received in Sectors A and B. When the RF signal represented by arrow 166 is received by Sector A, a portion of the energy from that RF signal will also be received by Sectors D, B and C. Since there is only one signal, an arbitration must take place to determine which signal is the best signal to report. Similarly, when an RF signal represented by arrow 168, is received, the system should only report one signal instead of reporting two or more. Discriminating between RF signals received in the various sectors is accomplished through sector arbitration which will be discussed further below with reference to FIGS. 14 and 15.

Figure 8:
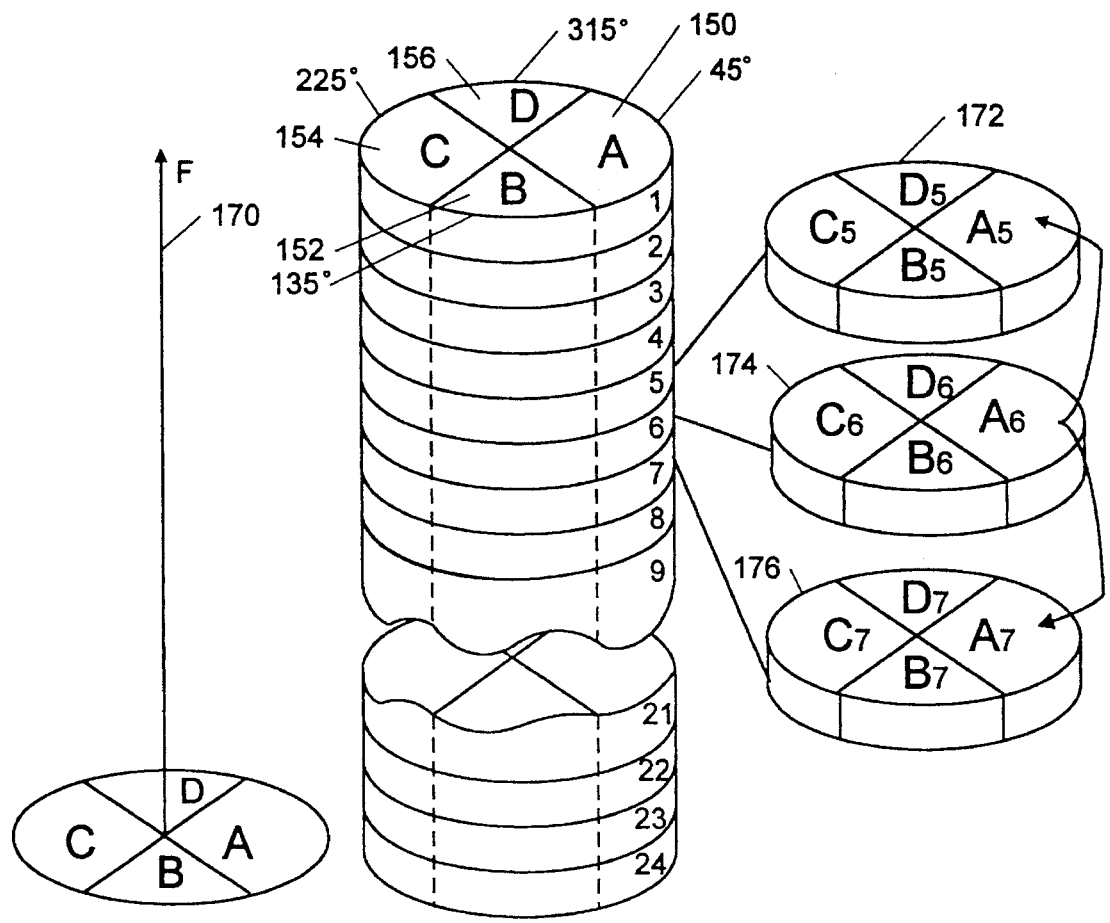
FIG. 8 is a diagram showing the relationship between sectors and channels in a channelized receiver.

Sectors A, B, C and D shown in FIG. 7 are also represented in FIG. 8 by the cylindrical diagram which has been divided into sectors with each sector having 24 channels. The Sectors A, B, C and D in FIG. 8 correspond to the Sectors A, B, C and D in FIG. 7. As shown in FIG. 8, Sector A numbered 150 has 24 channels which correspond to the 24 channels labeled as number 36 in FIG. 2. As shown in diagram 170 in FIG. 8, each of the channels in Sectors A, B, C and D is responsible for detecting a selected frequency band. Therefore, each of the Sectors A, B, C and D is capable of observing 24 individual frequency bands. Three of those frequency bands are shown in breakaway sections 172, 174 and 176 which correspond to the three channel 5, 6 and 7. Each of these channels has the same circuitry as described with reference to FIG. 2. Therefore, in total, there are 96 channels or 24 channels in each sector. Each of the channels has the same circuitry shown in FIG. 2. When a signal is received by channel $A_6$, rabbit-ear signals will also be received in channels $A_5$ and $A_7$. The signals received in channels $A_5$ and $A_7$ are not true signals and should be rejected. The rejection of these false signals is accomplished by channel arbitration which will be explained below with reference to FIGS. 9, 10, 11, 12 and 13.

Figure 9:
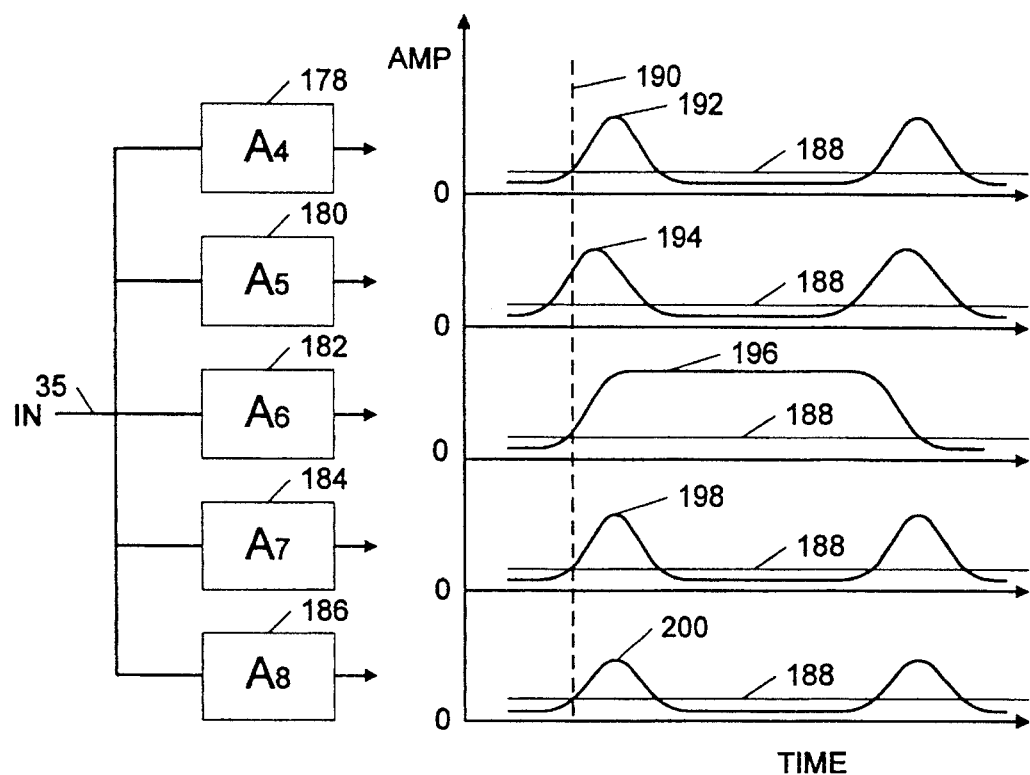
FIG. 9 is a diagram showing signals received in adjacent channels of a channelized receiver.
Figure 10:
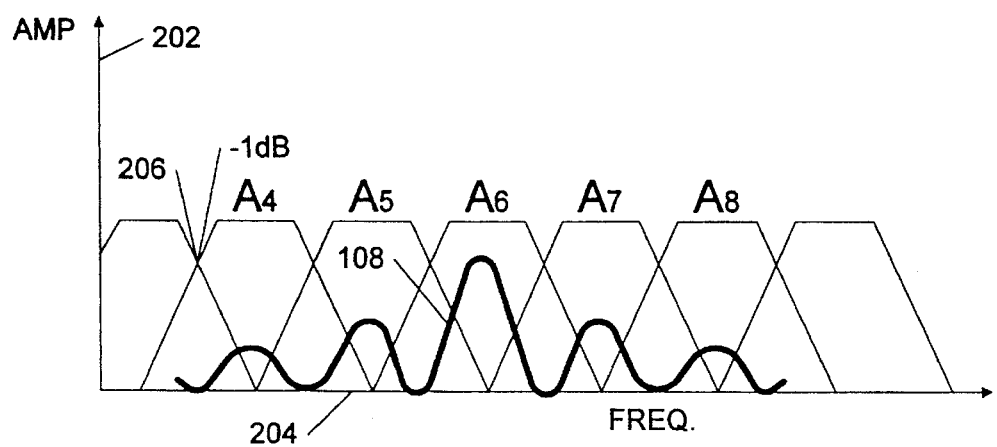
FIG. 10 is a spectrum diagram of energy received by adjacent channels in a channelized receiver.

FIG. 9 shows five of the channels, channel $A_4$–$A_8$ which correspond to channels $A_4$–$A_8$ in FIG. 8. The output of the amplifiers 178, 180, 182, 184 and 186 are the same log video outputs as discussed with reference to amplifier 55 in FIG. 2. The signals out of amplifiers 178–186 are shown in waveforms 192–200 respectively. The true waveform is received in channel $A_6$. This is also shown by the frequency chart shown in FIG. 10. The frequency bands corresponding to channels $A_4$–$A_8$ are labeled in FIG. 10. FIG. 10 shows that most of the energy is present in the frequency band covered by channel $A_6$ and that decreased amounts of energy show up in channels $A_5$ and $A_7$ and even further decreased amounts of energy show up in channels $A_4$ and $A_8$. This diagram of the spectral power output of a pulse signal shows the power present in each of the frequency bands; however, it is not the cause of the rabbit-ears shown in waveforms 192, 194, 198 and 200. The rabbit-ears shown in those waveforms are caused by the leading and falling edges of the waveform 196 shown in FIG. 9. The leading edge of waveform 196 causes the rabbit-ears shown in waveforms 192, 194, 198 and 200. Also, the trailing edge of waveform 196 causes corresponding rabbit-ears in its adjacent channels. Each of the channels are shown with a threshold voltage level 188. When the waveforms 192–200 appear, it is possible that nine separate pulses could be reported in nine separate pulse descriptor words. This does not reflect the true situation because only one true signal is being received in channel $A_6$. Therefore, it is necessary to identify the false signals in channels $A_4$, $A_5$, $A_7$ and $A_8$ and at the same time not miss any true signals that may show up in channels $A_4$, $A_5$, $A_7$ and $A_8$ during the same time period. It is important to note that rabbit-ears do not necessary start at the same time as the main signal. For instance, the signal 196 shown on channel $A_6$ has a start time represented by line 190. The rabbit-ears corresponding to that signal may start before or after the start time shown by line 190. Waveform 194 is shown as starting before waveform 196 to illustrate this point. The problems arbitrating between these types of signals will now be discussed with reference to FIGS. 11, 12 and 13.

Figure 11:
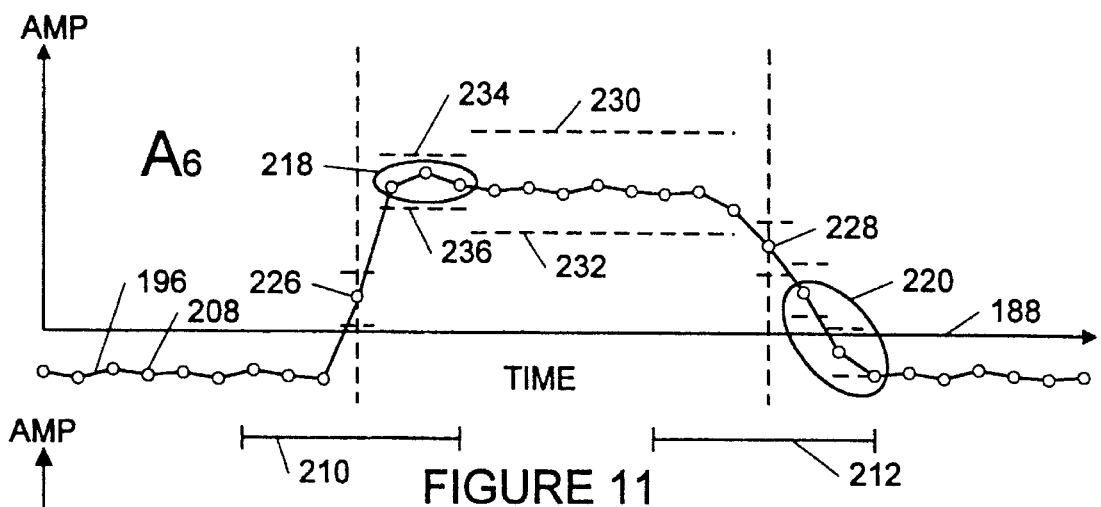
FIG. 11 is a waveform diagram showing amplitude samples of a waveform useful in explaining channel arbitration.
Figure 12:
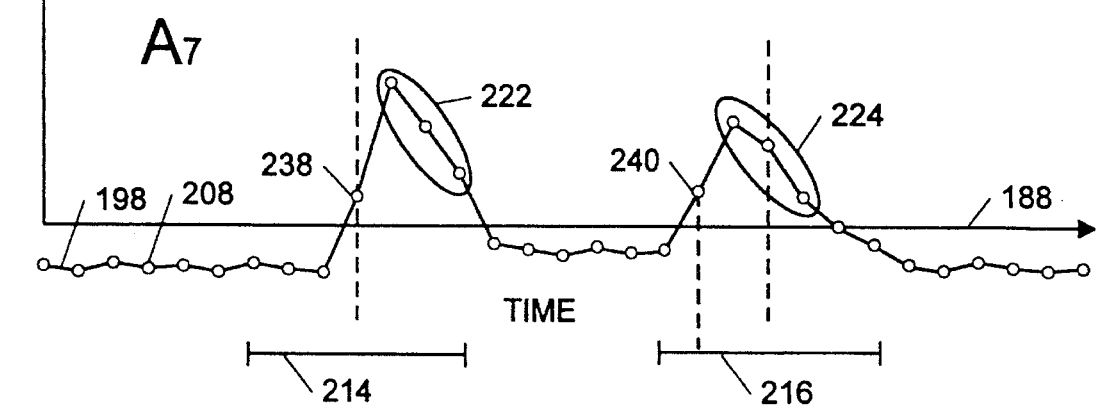
FIG. 12 is a waveform diagram of a signal in a channel adjacent to the signal in FIG. 11 that is useful in explaining channel arbitration.

Arbitration is a function that determines which video channel has a pulse and which video channels are only receiving energy "spill-over" from adjacent channels. The arbitration function uses time of arrival (TOA) and pulse amplitude (PA) to determine which channel or sector has the true pulse. If adjacent channels detect a pulse at about the same, then only the video with the largest signal will be reported. Integrated pulse amplitude data is used as the basis for arbitration. There are two basic modes for arbitration, pulse event based and elapsed pulsed based. For pulse event based arbitration, an integration of a given video's pulse amplitude data occurs whenever that video gains integrated pulse present becomes unstable or reestablishes a new stable region. To arbitrate, the system looks at three parameters, namely, time, magnitude and time alignment or time correlation between signals. The following is an example of channel arbitration and how it works to select the right signal and eliminate the false signals. FIG. 11 shows waveform 196 which corresponds to waveform 196 in FIG. 9. The circles 208 represent amplitude samples that are converted to digital information by the A/D converter 60 shown in FIG. 2. When amplitude sample 226 occurs, it is above the threshold 188 and signals the time of arrival of waveform 196. At that time a coincident window 210 is established that extends a programmable number of clock cycles before and after the amplitude sample 226. Any signal in the two channels adjacent to channel $A_6$ with the time of arrival within coincident window 210, will have an arbitration with signal 196. After the occurrence of amplitude sample 226 in this example, the system integrates the next three amplitude samples 218 to produce a total value which represents the total integrated power for waveform 196 during those sample periods. At the same time, waveform 198 shown in FIG. 12 takes amplitude sample 238 which is above the threshold 188. The system then integrates the power from the next three amplitude samples 222 to obtain a total power value represented by the total of the amplitude samples 222. Since the TOA, represented by amplitude sample 238 is within the time period 210, there will be an arbitration between the two waveforms shown in FIGS. 11 and 12. It is important to note at this point that each time a signal appears in one of the channels, amplitude samples will be integrated and stored in a present integration register for comparison to each of its neighboring channels if a signal appears within its coincidence window. Therefore, the power represented by amplitude samples 218 will be compared to the power represented by amplitude samples 222. Since the power samples 218 are greater, they will win the arbitration and the signal represented by amplitude samples 222 will be rejected. So far, $A_6$ has won the arbitration. Power samples 218 are stored in a present integration register for that channel until the waveform 196 has a programmable number of amplitude samples that occur below the amplitude threshold 188. This can be, for instance, when 2 out of the last three amplitude samples have fallen below the amplitude threshold 188. The pulse will then be declared gone and the present integration register will be transferred to a past integration register for that channel. At the start of a new signal, the past integration register will be set to zero. At this time, another feature of the invention should be noted which is the establishment of hit windows and miss windows. A hit window is established when a programmable number of amplitude samples such as three consecutive amplitude samples fall within a predetermined range. This is shown by the line 234 and 236 in FIG. 11. When three consecutive pulse samples have occurred within a preprogrammed amplitude range, the waveform is declared stable and a miss window shown by lines 230 and 232 will be established which may be somewhat larger than the hit window. The miss window is used to determine when the waveform shown in FIG. 11 becomes unstable which is indicated by amplitude samples that fall outside of the miss window. Thus, when amplitude sample 228 occurs outside of the miss window, the waveform has lost stable. This triggers an event which causes the integration of, for example, the next three amplitude samples 220. After these amplitude samples 220 have been integrated the channel will look to see if any pulses occurred within the coincidence window 212 which was established when the waveform 196 lost stable. Waveform 198 in channel $A_7$ had amplitude sample 240 which occurred within the amplitude window 212. Therefore, there will be an arbitration between waveform 196 and waveform 198. In this situation, the arbitration between amplitude samples 220 and amplitude samples 224 will result with an incorrect win by amplitude samples 224. However, to avoid this result, a previous arbitration has taken place in which amplitude samples 218 in the past integration register are compared to amplitude samples 220 in the present integration register for that channel. The larger of the two integration registers 218 are compared to amplitude samples 224 which results in amplitude samples 218 winning the arbitration. Therefore, anytime an arbitration event occurs, the amplitude samples associated with that arbitration event will be compared to amplitude samples from the past or present arbitration events in adjacent channels, whichever is larger, that occur within the coincidence windows. In this way, trailing edge rabbit-ears represented by amplitude samples 224 will be compared to the leading edge amplitude samples 218 of waveform 196. This ensures that true rabbit-ear signals will always be rejected. Thus, each time a signal is detected in any channel, that channel will look, within its coincidence window at each adjacent channel to see if an arbitration event has occurred in that adjacent channel. Additionally, it will look at the past or present integration register of those adjacent channels, whichever is greater, to see if the adjacent channel is larger. If the arbitration event is larger than the adjacent event, then the arbitration event wins. If the arbitration event is smaller than the adjacent event, then the arbitration event loses. This concept is further illustrated with reference to FIG. 13 which is a diagram to show the contents of the present integration register as well as the past integration register for a single channel. This pair of integration registers are repeated for all channels and sectors in the receiver.

Figure 13:
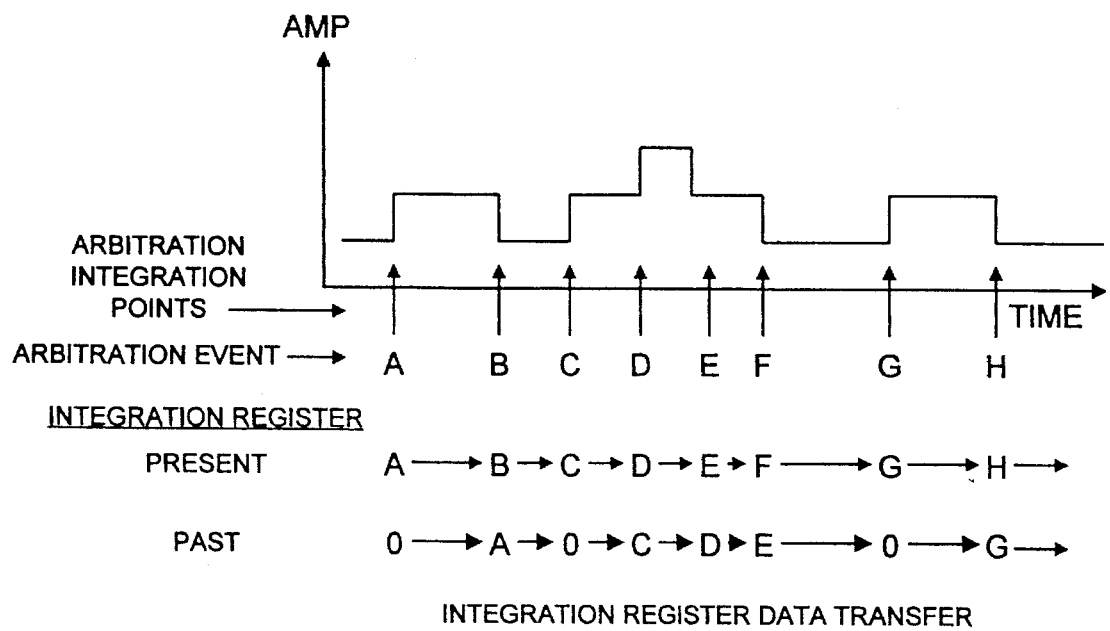
FIG. 13 is a diagram showing the contents of present and past integration registers during arbitration events.

When arbitration event A in FIG. 13 occurs, this value is stored in the present integration register. The previous arbitration event at that point is zero and the past integration register stores a value of zero. When arbitration event B occurs the present integration register will store the results of that integration and transfer the A integration events to the past integration register. When arbitration event C occurs the present integration register stores that value and past integration register stores the past arbitration event which is zero because of the transition of the waveform to a loss of signal during arbitration event B. Therefore, each time an arbitration event occurs such as D, E, F, G and H, the present integration register will store the value of that arbitration event and pass its old value to the past integration register. As a further example, when arbitration event E occurs the present integration event stores that value and the past integration event stores the value of the immediate past arbitration event which is D. Therefore, each channel has a present and a past integration register which contains the values for the integration that occurred as the result of the present arbitration event as well as its immediate past arbitration event. These values are available for comparison to each adjacent channel in the case that a signal occurs within the coincidence window of that arbitration event. The method of sector arbitration will now be discussed with reference to FIGS. 14 and 15.

If a signal achieves a stable condition, as described previously, then the arbitration is reevaluated for a stable signal, the arbitration event is always compared with the time-coincident present arbitration events in adjacent channels and sectors, even if those values are less than their past events. Since, by their nature, rabbit-ears cannot be stable, the stable condition indicates that this event cannot be from a rabbit-ear and must be from a potential signal. Therefore, the arbitration is re-evaluated with the knowledge that this arbitration event cannot be from a rabbit-ear and only present events are compared.

Figure 14:
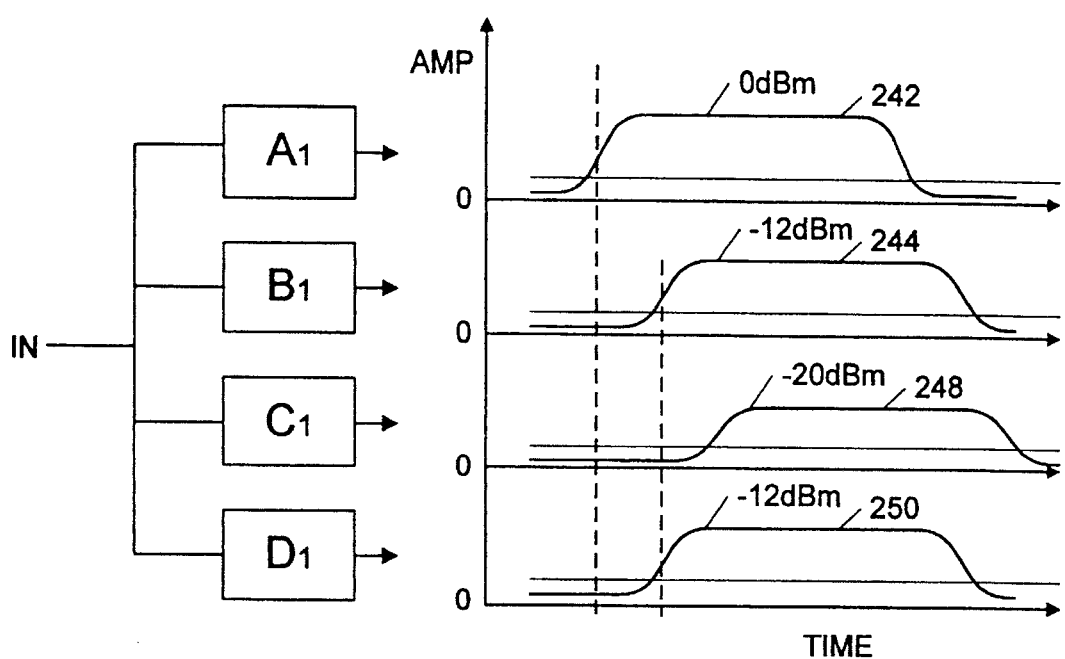
FIG. 14 is a diagram showing waveforms received by adjacent sectors covering the same frequency.

FIG. 14 shows the waveforms that occur in Sectors A, B, C and D when an RF signal represented by line 166 in FIG. 7 impacts Sector A at its 0 dB point or at bore sight. The Sectors A, B, C and D are referred as Sectors $A_1$, $B_1$, $C_1$ and $D_1$ because each of the sectors is looking at the same frequency. Accordingly, the adjacent sectors would be $A_2$, $B_2$, $C_2$ and $D_2$ as previously explained with reference to FIG. 8. When the RF signal represented by line 166 in FIG. 7 is received in Sectors $A_1$, $B_1$, $C_1$ and $D_1$, the result in waveforms 242, 244, 248 and 250 appear in their respective channels. Since the signal 166 impacts Sector $A_1$ first, that waveform will appear first in time with respect to the waveforms in Sectors $B_1$, $C_1$ and $D_1$. The waveforms in Sectors $B_1$ and $D_1$ will be nearly identical in time of arrival and in total amplitude as shown by waveforms 244 and 250. The RF signal 166 will reach Sector $C_1$ last which is the furthest sector away. Therefore, waveform 248 in Sector $C_1$ will have a time of arrival later than the signals in Sectors $B_1$ and $D_1$ and also it will be a much weaker signal. Therefore, if the amplitude of waveform 242 is considered to be 0 dBm then the waveforms in Sectors $B_1$ and $D_1$ could have, for example, an amplitude of −12 dBm and the waveform in Sector $C_1$ could have an amplitude of −20 dBm. The arbitration between the signals in these sectors is handled in an identical fashion as that explained with respect to the channel arbitration except that the arbitration takes place between all of the sectors. Therefore, Sector $A_1$ will arbitrate with $B_1$, $C_1$ and $D_1$; Sector $B_1$ will arbitrate with $A_1$, $C_1$ and $D_1$; Sector $C_1$ will arbitrate with $A_1$, $B_1$ and $D_1$ and Sector $D_1$ will arbitrate with Sectors $A_1$, $B_1$ and $C_1$. In each instance, a coincidence window is established which is programmably selectable. Once this window is established, the integrated amplitudes for each arbitration event will be calculated and stored in the present integration registers. This value will be compared to the largest of the past and present integration registers of any sector that had an arbitration event occur within the coincidence window just mentioned. Since, in this example, the integrating register in Sector $A_1$ will have the highest value, the waveform 242 will be declared the winner. Similarly, integration events will be declared if a waveform loses stable or if a waveform establishes a new center value for its stable window as illustrated by arbitration events D and E in FIG. 13.

It is important to note that all of the integrations use an identical number of amplitude samples for the integration and that all of the integrations are completed before an arbitration using one of the integrations is initiated. This insures that each of the integrations will be useful because it will represent the same opportunity to accumulated amplitude for each signal.

Figure 15:
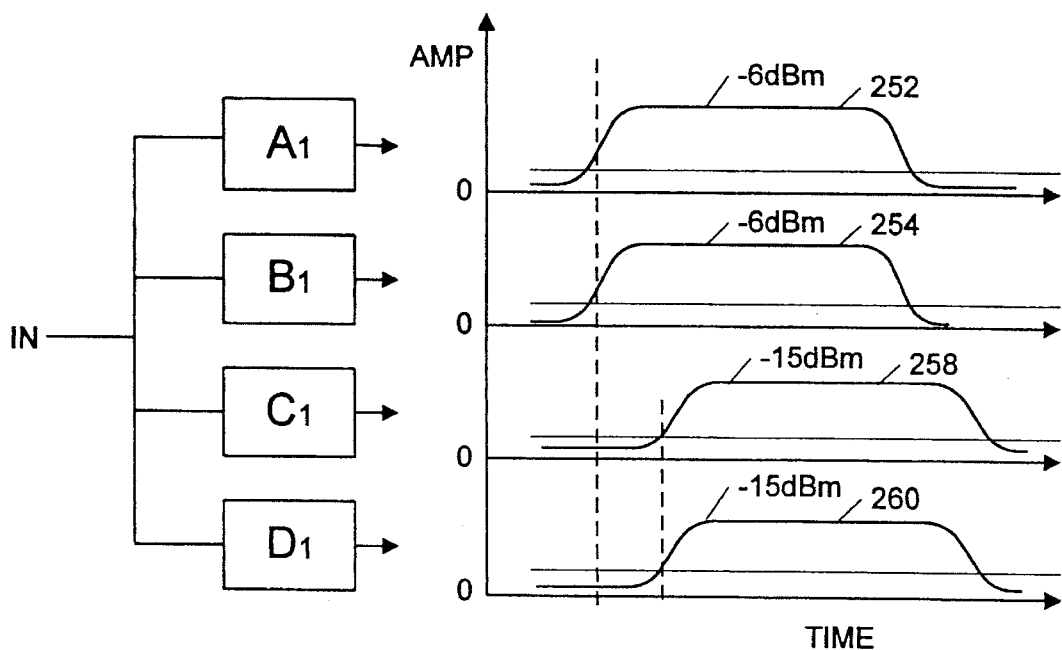
FIG. 15 is a diagram showing waveforms received by adjacent sectors looking at the same frequency when a signal is received on the border between two sectors.

FIG. 15 illustrates the signals that would be present in Sectors $A_1$, $B_1$, $C_1$ and $D_1$ if a signal represented by arrow 168 in FIG. 7 arrived at the 6 dB crossover point 158 between Sectors $A_1$ and $B_1$. The result is that waveforms in Sectors $A_1$ and $B_1$ would be substantially identical with substantially identical start times and substantially identical amplitudes as indicated by waveforms 252 and 254 in FIG. 15. The waveforms in Sectors $C_1$ and $D_1$ represented by waveforms 258 and 260 will have a later time of arrival and will be somewhat attenuated in amplitude such as −15 dBm as compared to an amplitude of −6 dBm for waveforms 252 and 254. In the ensuing arbitration, waveforms 252 and 254 would appear to both win; however, under such circumstances, the system is preprogrammed so that if there is a tie then one of the waveforms will be automatically selected as follows:

| TIE BETWEEN | SELECT |
|---|---|
| A & B | A |
| B & C | B |
| C & D | C |
| D & A | D |

It should be noted that when the waveform 242 in FIG. 14 is present in Sector $A_1$, Sectors $A_2$ and $A_3$ will have rabbit-ears and Sectors $B_2$, $B_3$, $D_2$ and $D_3$ will also have rabbit-ears. The channel arbitration occurring between those channels will eliminate the rabbit-ears in those sectors and those channels and the only waveform that will emerge a winner is the waveform in Sector $A_1$.

In this manner, the system can reject spurious signals occurring in the frequency domain and in the spatial by employing the previous methods for channel and sector arbitration.

It is believed that the foregoing description of the preferred embodiment of the invention is sufficient in detail to enable one skilled in the art to make and use the invention. However, it is expressly understood that the details of the elements that are presented are not intended to limit the scope of the invention inasmuch as equivalence to those elements and other modifications thereof all of which come within the scope of the invention, become apparent to those skilled in the art upon reading this specification. Thus, the invention is to be broadly construed within the full scope of the appended claims.

What is claimed is:

1. A pulse present detection system comprising:

receiver means for receiving an RF signal and amplifier means for amplifying said RF signal;

converter means connected to said amplifier means for converting said received RF signal to digital words representing the instantaneous amplitude over selected periodic time increments of said RF signal, detector means having multiple threshold levels in which the digital value of said sampled RF signal is compared to the threshold values, each threshold value having a separate and programmable number of amplitude samples that must occur above said threshold before a pulse presence is declared, each threshold level having a separate reporting means for reporting a separate pulse presence signal, and resolution means for selecting between pulse present signals reported by said threshold levels wherein the first threshold level to report a pulse present is selected.

2. A pulse present detection system comprising:

receiver means for receiving an RF signal and amplifier means for amplifying said RF signal, converter means connected to said amplifier means for converting said received RF signal to digital words representing the instantaneous amplitude over selected periodic time increments of said RF signal, and detector means for detecting high amplitude, short duration pulses and low amplitude, long duration pulses, said detector means having multiple threshold levels in which the digital value of said sampled RF signal is compared to the threshold values, a first of the threshold levels being higher in amplitude than a second of the threshold levels, said detector means identifying a pulse presence signal upon the occurrence of either of the following events:

1) when X samples are above the first threshold level; or 2) when Y samples are above the second threshold level, wherein both X and Y are integers and are separately programmable, both the first and second threshold levels also are separately programmable, and wherein Y is greater than X so that the first threshold level detects said high amplitude short duration pulses and the second threshold level detects said low amplitude long duration pulses.

3. The pulse present detection system of claim 1 including:

hysteresis means associated with each threshold means for lowering said threshold value by a preprogrammed amount when a pulse presence is detected for that threshold.

4. The pulse present detection system of claim 1 including:

hysteresis means associated with each threshold means for lowering said threshold value by a preprogrammed amount when a pulse presence is detected for that threshold.

5. The pulse present detection system of claim 1 wherein said digital samples are taken at a predetermined time interval from between 20 nanoseconds and 100 nanoseconds.

6. A system for arbitrating between RF signals in adjacent frequency bands comprising:

receiver means for receiving an RF signal, amplifier means connected to said receiver means for amplifying said received RF signal, converter means for converting said amplified RF signal to digital words, said conversions taking place instantaneously on a periodic basis, arbitration means having a present and a past integration register, said arbitration means having programmable arbitration events, said arbitration events being the initial presence of a pulse and loss of stable, said arbitration means further having means for indicating the end of a signal, second amplifier means connected to said receiver means for amplifying said received RF signal, second converter means for converting said amplified RF signal to digital words, said conversions taking place instantaneously on a periodic basis, second arbitration means having a second present and a second past integration register, said arbitration means having programmable arbitration events, said arbitration events being the initial presence of a pulse and loss of stable, said arbitration means further having means for indicating the end of a signal, said arbitration means integrating a predetermined number of amplitude samples at the beginning of a pulse and storing said amplitude samples in said present integration register, said arbitration means establishing a coincident window wherein if a pulse in said second arbitration means arrives within said coincidence window, said second arbitration means integrates a predetermined number of amplitude samples of said pulse and stores said integrated value in said second present integration register of said second arbitration means, said first arbitration means comparing the contents of said present integration register to the larger of the contents of said second past and present integration registers.

7. The system of claim 6 wherein:

said arbitration means further storing amplitude samples upon loss of stable and establishing a coincidence window at loss of stable for comparison to a signal in said second arbitration means occurring during said coincidence window and transferring the contents of said present integration register to said past integration register and comparing the larger of the contents of said second past and present integration register to the contents of said first present integration register to determine which signal will be reported.

8. The system of claim 6 wherein:

said amplifier means convert said received RF signal to a log video signal.

9. The system of claim 6 wherein:

the coincidence window established by said arbitration means is programmable in width.

10. The system of claim 7 wherein:

the coincidence windows established by said arbitration means are programmable in width.

11. A system for arbitrating between RF signals in adjacent frequency bands comprising:

receiver means for receiving an RF signal, amplifier means connected to said receiver means for amplifying said received RF signal, converter means for converting said amplified RF signal to digital words, said conversions taking place instantaneously on a periodic basis, arbitration means having a present and a past integration register, said arbitration means having programmable arbitration events, said arbitration events being the initial presence of a pulse and loss of stable, said arbitration means further having means for indicating the end of a signal, second amplifier means connected to said receiver means for amplifying said received RF signal, second converter means for converting said amplified RF signal to digital words, said conversions taking place instantaneously on a periodic basis, second arbitration means having second present and a second past integration register, said arbitration means having programmable arbitration events, said arbitration events being the initial presence of a pulse and loss of stable, arbitration means further having means for indicating the end of a signal, said arbitration means integrating a predetermined number of amplitude samples at the end of a pulse and storing said amplitude samples in said present integration register, said arbitration means establishing a coincident window wherein if a pulse in said second arbitration means arrives within said coincidence window, said second arbitration means integrates a predetermined number of amplitude samples of said pulse and stores said integrated value in said second present integration register of said second arbitration means, said first arbitration means comparing the contents of said present integration register with the contents of second integration register.

12. A radio frequency (RF) receiver system comprising:

a plurality of antennas, each antenna covering a separate but adjacent sector in space;

amplifier means connected to each of the antennas;

detector means, coupled to the amplifiers, for sensing when RF signals are received by multiple antennas within a given coincidence window of time; and arbitration means for selecting the RF signal detected by only one of the antennas by comparing the strengths of the signals received by the antennas within the coincidence window and choosing the signal having the greatest power.

13. The system of claim 12 wherein the time of the coincidence window is programmable.

14. The system of claim 12 wherein said arbitration means is preprogrammed to select a predetermined single antenna signal in the event that plural signals have substantially the same power.

15. A system for arbitrating between RF signals in adjacent frequency bands comprising:

a receiver having a plurality of channels having adjacent frequency bands, each frequency band having an amplifier providing an output signal;

threshold means for determining when the output signals from a plurality of amplifiers exceed a given threshold level within a programmable coincidence window of time; and arbitration means for selecting the output signal from the amplifier having the greatest power and rejecting signals from the other amplifiers thereby eliminating energy spill-over from channels adjacent to the channel associated with the proper frequency of the received signal.

* * * * *